(12) United States Patent
Chae et al.

(10) Patent No.: US 10,118,507 B2
(45) Date of Patent: Nov. 6, 2018

(54) SEAT PUMPING DEVICE FOR VEHICLE

(71) Applicant: HYUNDAI DYMOS INCORPORATED, Seosan-si (KR)

(72) Inventors: Soo Young Chae, Yongin-si (KR); Young Sun Lee, Namyangju-si (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 0 days.

(21) Appl. No.: 15/446,808

(22) Filed: Mar. 1, 2017

(65) Prior Publication Data

US 2017/0253149 A1    Sep. 7, 2017

(30) Foreign Application Priority Data

Mar. 3, 2016    (KR) .................... 10-2016-0025824

(51) Int. Cl.
*B60N 2/16*    (2006.01)
*F16D 41/067*    (2006.01)
*B60N 2/90*    (2018.01)

(52) U.S. Cl.
CPC ........... *B60N 2/1635* (2013.01); *B60N 2/168* (2013.01); *B60N 2/938* (2018.02); *F16D 41/067* (2013.01)

(58) Field of Classification Search
CPC ..... F16D 41/067; F16D 41/088; B60N 2/168; B60N 2/16; B60N 2/938; B60N 2/1635
See application file for complete search history.

(56) References Cited

U.S. PATENT DOCUMENTS

| 6,481,557 B2 * | 11/2002 | Denis | B60N 2/167 |
| | | | 192/15 |
| 6,640,952 B2 * | 11/2003 | Baloche | B60N 2/167 |
| | | | 192/223.2 |
| 2015/0314709 A1 * | 11/2015 | Kim | B60N 2/165 |
| | | | 297/344.12 |

FOREIGN PATENT DOCUMENTS

| CN | 204895190 U | 12/2015 |
| DE | 11 2013 005 701 T5 | 9/2015 |
| DE | 10 2016 118 433 A1 | 4/2017 |
| KR | 10-0722849 B1 | 5/2007 |
| KR | 10-0784620 B1 | 12/2007 |
| WO | 2014148600 A1 | 9/2014 |

* cited by examiner

*Primary Examiner* — Jacob S. Scott
*Assistant Examiner* — Lillian T Nguyen
(74) *Attorney, Agent, or Firm* — Baker McKenzie; Hyunho Park

(57) ABSTRACT

Disclosed is a seat pumping device for a vehicle. The seat pumping device includes: a housing; a return spring guide which is fixedly coupled to the housing and has an embedded return spring; a clutch cam which is rotatably accommodated in the housing; and a lever bracket which is partially accommodated in the return spring guide and coupled to the clutch cam so as to be rotated integrally with the clutch cam, in which the lever bracket is maintained spaced apart from the return spring guide by a separation support means, thereby improving operating characteristics of a lever handle.

11 Claims, 7 Drawing Sheets

(a)            (b)

SEAT PUMPING DEVICE FOR VEHICLE

CROSS-REFERENCE TO RELATED APPLICATIONS

This application claims priority to and the benefit of Korean Patent Application No. 10-2016-0025824 filed in the Korean Intellectual Property Office on Mar. 3, 2016, the entire contents of which are incorporated herein by reference.

TECHNICAL FIELD

The present invention relates to a seat pumping device for a vehicle, and more particularly, to a seat pumping device for a vehicle which has a lever handle with improved operating characteristics.

BACKGROUND ART

A seat pumping device for a vehicle in the related art refers to a device which is attached to a seat in order to allow an occupant seated in the seat to manually adjust a height of a seat cushion in accordance with his/her body type. When the occupant seated in the seat manipulates a lever handle, which is installed at a lateral side of the seat cushion, clockwise or counterclockwise, operating force of the lever handle is transmitted to a link mechanism through the seat pumping device, such that the seat cushion moves upward or downward in response to a direction in which the lever handle is manipulated.

The seat pumping device for a vehicle has been publicly known through Korean Patent Nos. 10-0722849 and 10-0784620.

FIG. 1 illustrates an example of the seat pumping device for a vehicle. However, the seat pumping device for a vehicle, which will be described with reference to FIGS. 1 to 5, is considered as the related art in the present specification, but the seat pumping device for a vehicle has not been publicly known, and it should be understood that a description of the seat pumping device for a vehicle is just made to explain the background for the purpose of deriving the present invention.

A seat pumping device for a vehicle includes a lever bracket 100 which is integrally rotatably connected to a lever handle (not illustrated) manipulated by a user, a return spring guide 110 which accommodates return springs 112 that provide restoring force to the lever bracket 100, a housing 120 which is installed in a seat cushion (not illustrated) and has a shape of a drum 122, a clutch device 130 which is accommodated in the housing 120, receives rotational manipulation force from the user through the lever bracket 100, and transmits the rotational manipulation force, a brake device 140 which blocks reversely inputted torque and maintains an adjusted height of the seat cushion, and a housing cover 150 which is coupled to one side of the housing 120 and covers the housing 120.

One side of the return spring guide 110 may be formed in the form of a doughnut having a concave groove so as to accommodate the return springs 112.

The clutch device 130 includes a clutch cam 134 which is accommodated in a clutch drum 132, a plurality of clutch rollers 136 which is installed between an outer circumferential surface of the clutch cam 134 and an inner circumferential surface of the clutch drum 132, and clutch springs 138 which resiliently support the clutch rollers 136.

A plurality of coupling protrusions 135 is formed on one surface of the clutch cam 134 at a predetermined interval in a circumferential direction.

A through hole 126, into which the coupling protrusions 135 of the clutch cam 134 are inserted, is formed at a central portion of a bottom surface 124 of the drum 122 of the housing 120.

The lever bracket 100 may include a coupling drum 104 that protrudes in an axial direction.

Referring to FIG. 2, a plurality of assembly holes 128 is formed at a predetermined interval in the circumferential direction at the periphery of the through hole 126 at the center of the bottom surface of the drum 122 of the housing 120, and a plurality of assembly protrusions 114, which is inserted into and coupled to the assembly holes 128 and protrudes in the axial direction, is formed on the return spring guide 110 so as to be disposed at a predetermined interval in the circumferential direction. The return springs 112 may be provided so as to surround an outer side of the assembly protrusions 114.

Therefore, when the assembly protrusions 114 of the return spring guide 110 are inserted into and coupled to the assembly holes 128 of the housing 120, the return spring guide 110 comes into close contact with the bottom surface 124 of the drum 122 of the housing 120, as illustrated in FIG. 3. In addition, the return spring guide 110 is fixedly coupled to the housing 120 so as not to be rotatable relative to the housing 120 by an interaction between the assembly holes 128 and the assembly protrusions 114.

Referring to FIG. 4, the coupling protrusions 135 of the clutch cam 134 protrude through the through hole 126 at the center of the housing 120, and is integrally coupled to the lever bracket 100 by being inserted into the assembly holes formed in a bottom surface of the drum 104 of the lever bracket 100.

For example, the lever bracket 100 is integrally coupled to the coupling protrusions 135 of the clutch cam 134 by welding, such that the lever bracket 100 and the clutch cam 134 rotate together.

A lever arm 102, which is formed on the lever bracket 100 by being bent in the axial direction, is resiliently supported in the circumferential direction by the return springs 112 of the return spring guide 110, such that when the lever bracket 100 is rotated as the user manipulates the lever handle, the return springs 112 are compressed by the lever arm 102 of the lever bracket 100, and then provide elastic restoring force to the lever bracket 100.

However, as illustrated in FIG. 5, when the coupling protrusions 135 of the clutch cam 134 and the lever bracket 100 are coupled by welding, the lever bracket 100 excessively comes into close contact with an outer circumferential surface of the return spring guide 110. Therefore, when the lever bracket 100 is rotated by the manipulation of the lever handle, the lever bracket 100 is rotated in the state in which the lever bracket 100 is excessively in close contact with the outer circumferential surface of the return spring guide 110, and as a result, there is a problem in that excessive frictional force is generated between the lever bracket 100 and the outer circumferential surface of the return spring guide 110, which causes deterioration in operating characteristics of the lever handle.

SUMMARY OF THE INVENTION

The present invention has been made in an effort to provide a seat pumping device for a vehicle which is capable of improving operating characteristics of a lever handle by maintaining a state in which a lever bracket is spaced apart from a return spring guide at the time of assembling the lever bracket and a clutch cam.

An exemplary embodiment of the present invention provides a seat pumping device including: a housing; a return spring guide which is fixedly coupled to the housing and has an embedded return spring; a clutch cam which is rotatably accommodated in the housing; and a lever bracket which is partially accommodated in the return spring guide and coupled to the clutch cam so as to be rotated integrally with the clutch cam, in which the lever bracket is maintained spaced apart from the return spring guide by a separation support means.

The clutch cam may include a clutch cam body having a polygonal block shape, and the separation support means may include two seating projections which protrude in an axial direction from one surface of the clutch cam body and on which the lever bracket is seated.

The two seating projections may have the same height in an axial direction.

The two seating projections may be disposed symmetrically so as to be spaced apart from each other at a predetermined interval in a circumferential direction.

The two seating projections may be formed in an arc block shape.

Two coupling protrusions, which protrude in the axial direction and is integrally coupled to the lever bracket, may be formed on one surface of the clutch cam body.

The two coupling protrusions and the two seating projections may be alternately disposed in the circumferential direction.

The two coupling protrusions may have a quadrangular block shape, and may protrude to the same height in the axial direction.

Heights to which the two coupling protrusions protrude in the axial direction may be greater than heights to which the two seating projections protrude in the axial direction.

A through hole into which the two coupling protrusions and the two seating projections are penetratively inserted may be formed in the housing, and two first guide surfaces and two second guide surfaces, which guide rotations of the two coupling protrusions and the two seating projections, respectively, may be formed in the through hole.

The housing may include a drum, and the through hole may be formed to penetrate a bottom surface of the drum.

The first guide surface and the second guide surface may be alternately formed in the circumferential direction.

A radius of the first guide surface may be greater than a radius of the second guide surface, and a rotation radius of the two coupling protrusions may be greater than a rotation radius of the two seating projections.

According to the seat pumping device for a vehicle according to the exemplary embodiment of the present invention as described above, the seating projection, on which the lever bracket is seated, is formed on the clutch cam, such that when the coupling protrusion of the clutch cam is coupled to the lever bracket, the lever bracket is maintained spaced apart from the return spring guide while being seated on the seating projection of the clutch cam. Therefore, the lever bracket may smoothly rotate without creating frictional force with the return spring guide when the lever bracket is rotated by the manipulation of the lever handle, and as a result, it is possible to improve operating characteristics of the lever handle.

The seating projection also serves to guide the rotation of the clutch cam, and the clutch cam is stably rotated together with the lever bracket, and as a result, it is possible to improve operability of the seat pumping device.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
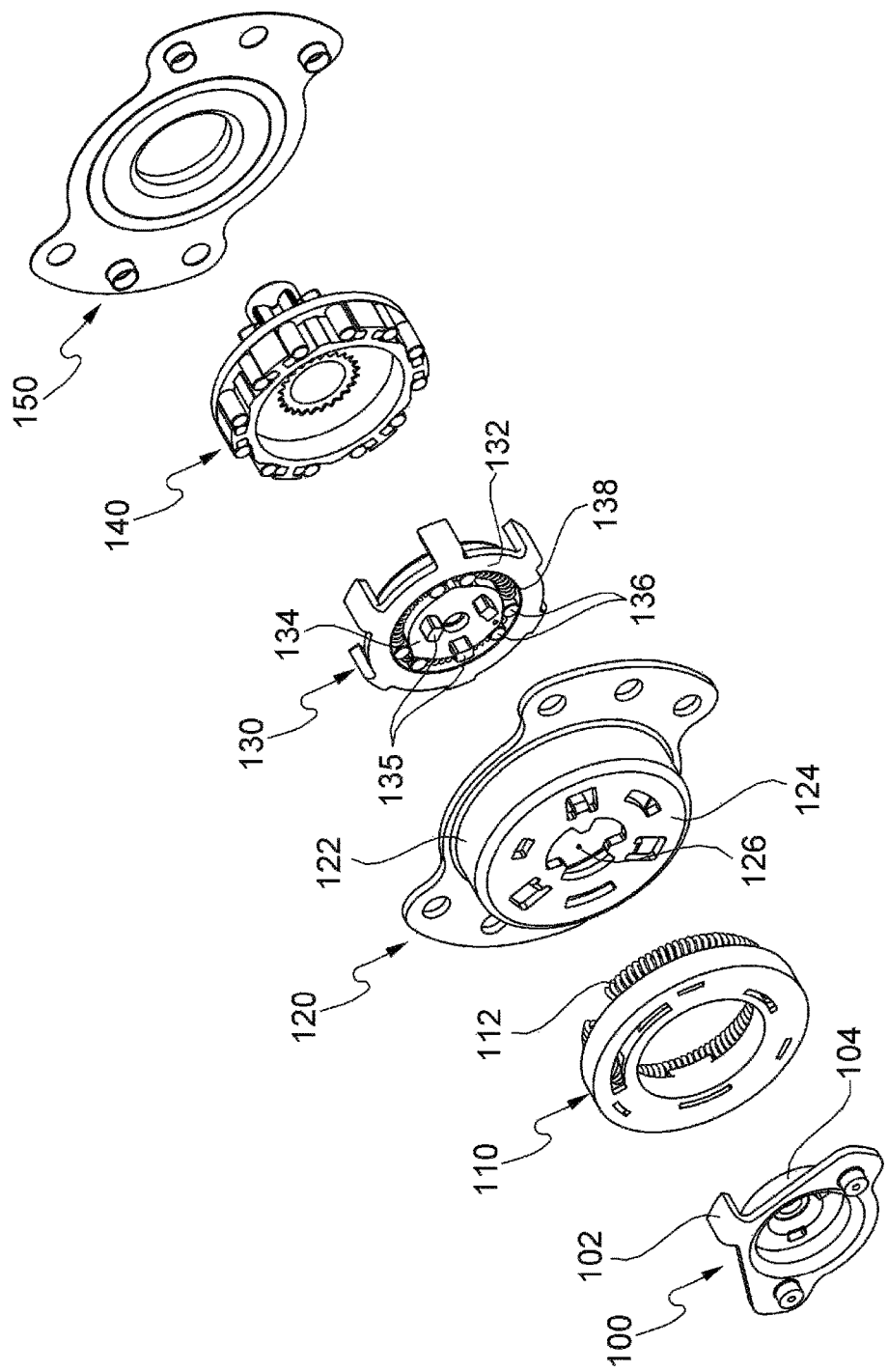
FIG. 1 is an exploded perspective view of a seat pumping device for a vehicle in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout several figures of the drawing.

DETAILED DESCRIPTION

Hereinafter, an exemplary embodiment of the present invention will be described in detail with reference to the accompanying drawings. First, in denoting reference numerals to constituent elements of respective drawings, it should be noted that the same constituent elements will be designated by the same reference numerals, if possible, even though they are illustrated in different drawings. Further, in the following description of the present invention, a detailed description of publicly known configurations or functions incorporated herein will be omitted when it is determined that the detailed description may make the subject matter of the present invention unclear. Further, an exemplary embodiment of the present invention will be described below, but the technical spirit of the present invention is not limited thereto and may be modified and variously carried out by those skilled in the art.

Figure 6:
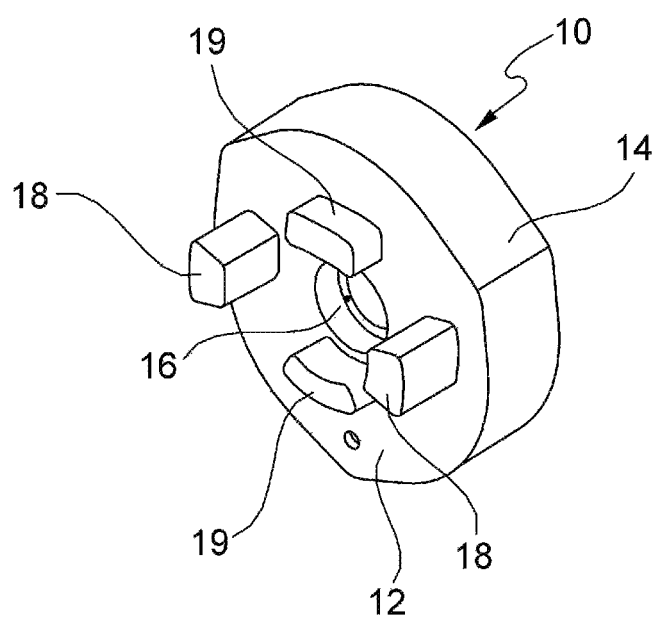
FIG. 6 is a perspective view of a clutch cam according to an exemplary embodiment of the present invention.

Referring to FIG. 6, a clutch cam 10, which is applied to a seat pumping device for a vehicle according to an exemplary embodiment of the present invention, may include a clutch cam body 12 having a polygonal block shape. Here, the clutch cam 10 is a member inserted into the clutch drum 132 in FIG. 1.

One or more wedge protrusions 14, which protrude outward in a radial direction, may be formed on an outer circumferential surface of the clutch cam body 12.

A central hole 16, which penetrates front and rear surfaces of the clutch cam body 12, may be formed at a central portion of the clutch cam body 12, and two coupling protrusions 18 may be formed symmetrically at the periphery of the central hole 16 at a predetermined interval in a circumferential direction.

The two coupling protrusions 18 have a quadrangular block shape, and may be formed to protrude in an axial direction from one surface of the clutch cam body 12.

Heights to which the two coupling protrusions 18 protrude in the axial direction may be equal to each other.

Two seating projections 19 may be formed symmetrically between the two coupling protrusions 18 at a predetermined interval in the circumferential direction.

The two seating projections 19 may be formed to protrude in the axial direction from one surface of the clutch cam body 12.

The two seating projections 19 are formed in, but not limited to, an arc block shape.

Heights to which the two seating projections 19 protrude in the axial direction may be equal to each other, and may be smaller than the heights to which the two coupling protrusions 18 protrude in the axial direction.

The two seating projections 19 constitute a separation support means that allows a lever bracket, which will be described below, to be spaced apart from a return spring guide.

Figure 7:
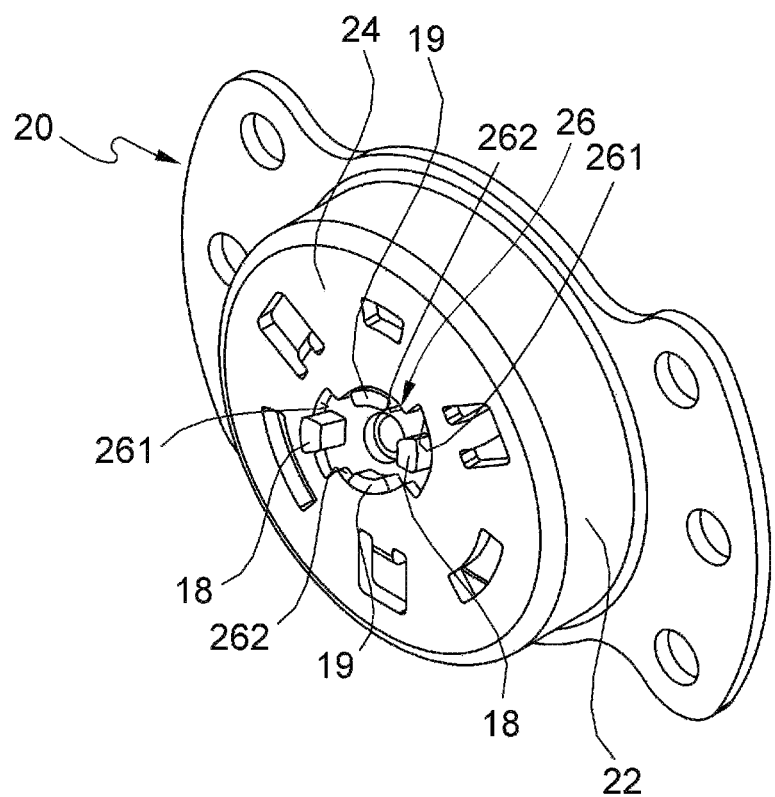
FIG. 7 is a perspective view illustrating a state in which the clutch cam according to the exemplary embodiment of the present invention is coupled to a housing.

Referring to FIG. 7, a housing 20 may include a drum 22, and the drum 22 may be provided with a bottom surface 24.

A through hole 26, which penetrates the bottom surface 24, may be formed at a central portion of the bottom surface 24.

Two first guide surfaces 261, which have an arc shape and guide rotations of the two coupling protrusions 18, and two second guide surfaces 262, which have an arc shape and guide rotations of the two seating projections 19, may be provided in the through hole 26.

The first guide surface 261 and the second guide surface 262 may be continuously formed alternately in the circumferential direction.

A radius of the first guide surface 261 may be greater than a radius of the second guide surface 262, and a rotation radius of the two coupling protrusions 18 of which the rotation is guided by the first guide surfaces 261 may be greater than a rotation radius of the two seating projections 19 of which the rotation is guided by the second guide surfaces 262.

Figure 2:
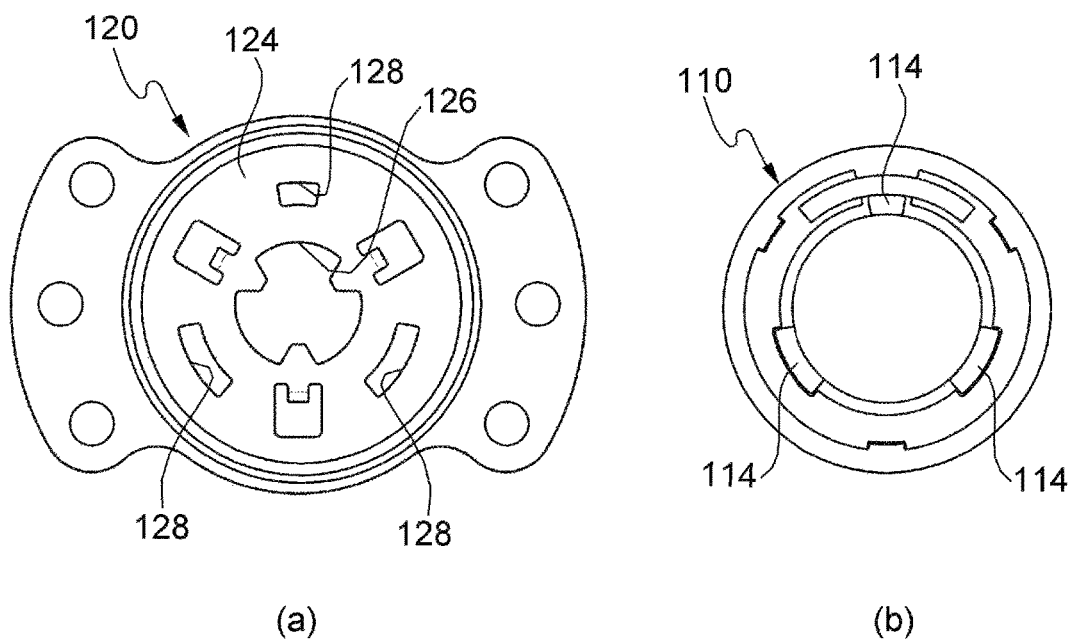
FIG. 2 is a top plan view of a housing and a return spring guide of the seat pumping device for a vehicle in the related art.
Figure 3:
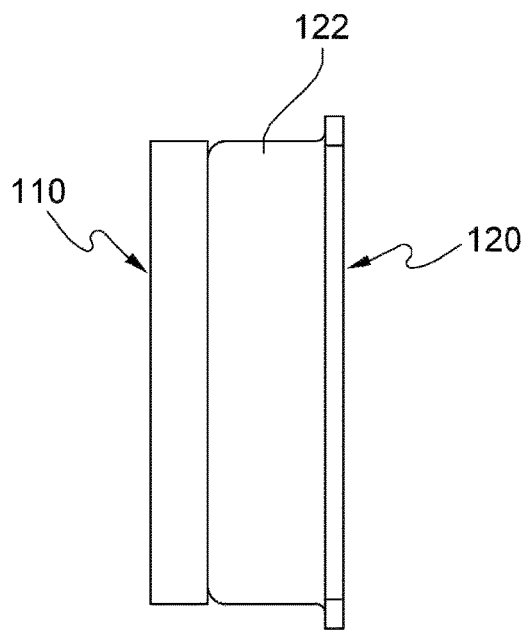
FIG. 3 is a side view illustrating a state in which the housing and the return spring guide of the seat pumping device for a vehicle in the related art are coupled.
Figure 4:
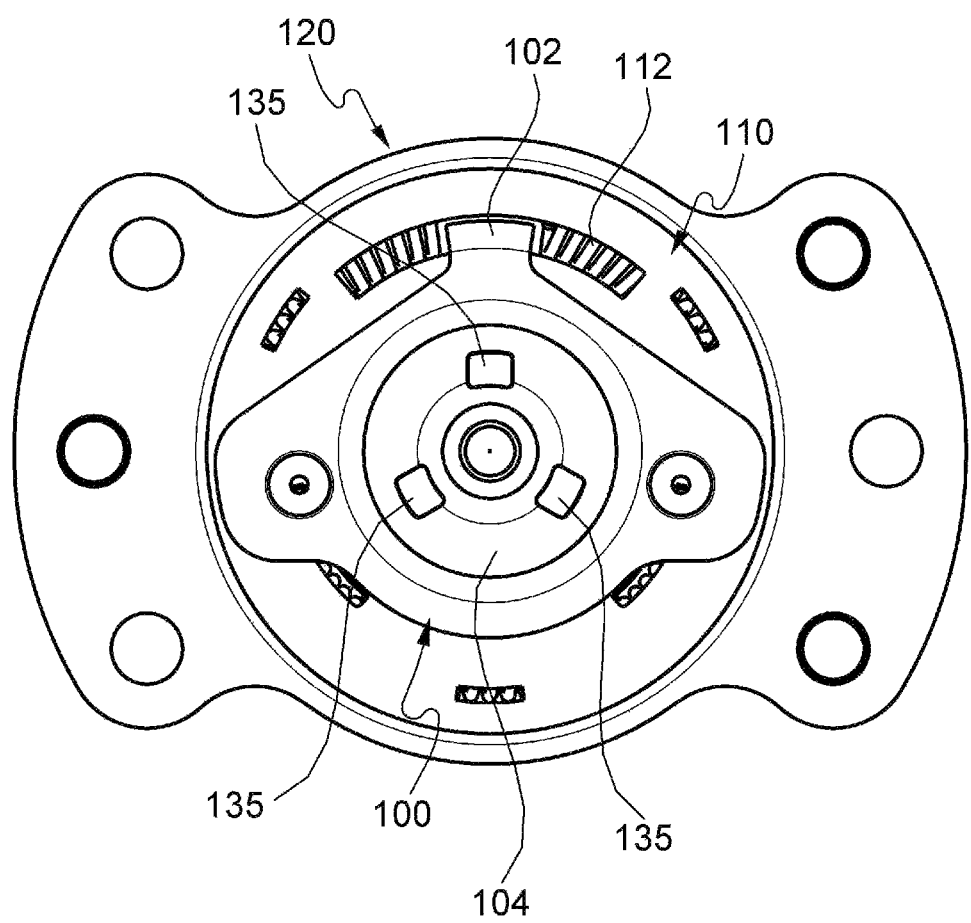
FIG. 4 is a top plan view illustrating a state in which a clutch cam and a lever bracket are coupled to the return spring guide coupled to the housing of the seat pumping device for a vehicle in the related art.
Figure 5:
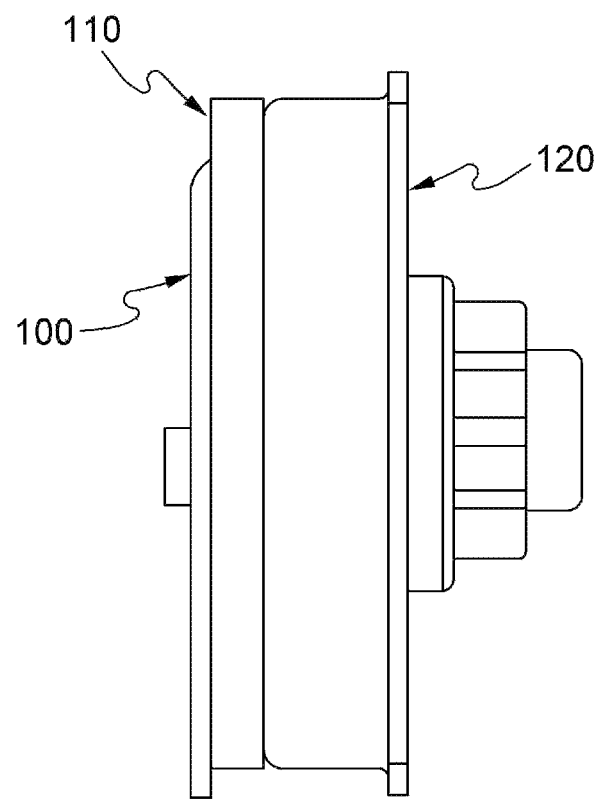
FIG. 5 is a side view illustrating a state in which the housing, the return spring guide, and the lever bracket of the seat pumping device for a vehicle in the related art are coupled.
Figure 8:
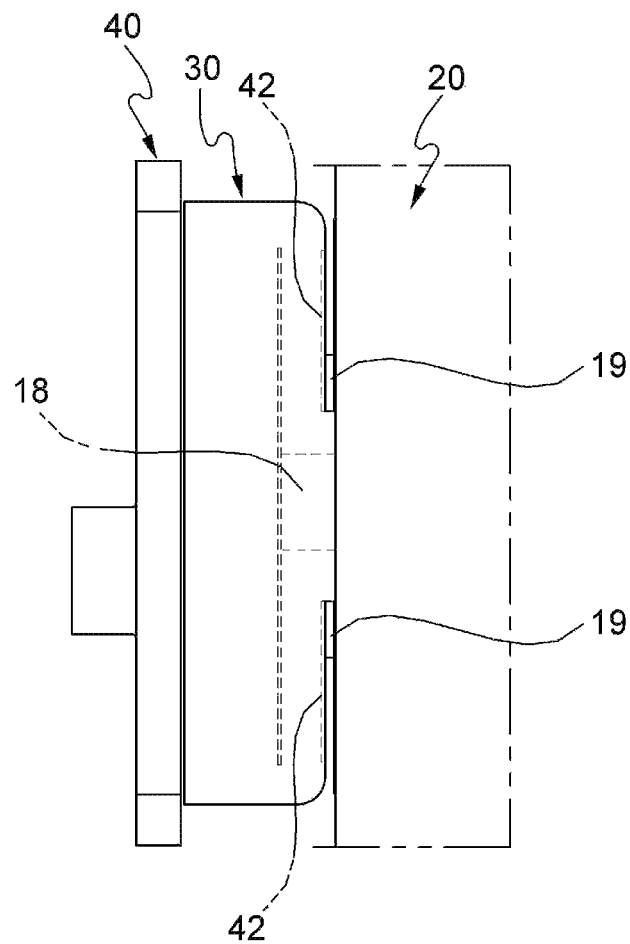
FIG. 8 is a side view illustrating a state in which the clutch cam and a return spring guide are coupled to the housing according to the exemplary embodiment of the present invention.

Referring to FIG. 8, a return spring guide 30, which accommodates a return spring, may be fixedly coupled to the housing 20, as described with reference to FIG. 2.

The return spring guide 30 may be formed in a ring shape with a penetrated center, and a part of a lever bracket 40 may be inserted into the ring shape, such that the return spring guide 30 may be coupled to the two coupling protrusions 18 of the clutch cam 10 by welding.

Figure 9:
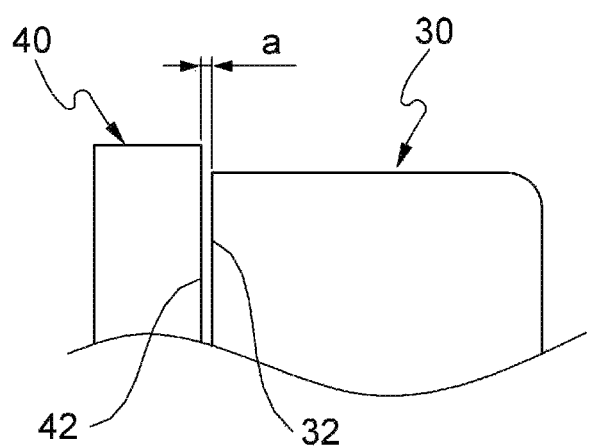
FIG. 9 is an enlarged view of main parts of a lever bracket and the return spring guide according to the exemplary embodiment of the present invention.

In this case, a bottom surface 42 of the lever bracket 40 may be seated on the two seating projections 19 of the clutch cam 10, and as a result, one surface 42 of the lever bracket 40 in the axial direction is spaced apart from an outer circumferential surface 32 of the return spring guide 30 which faces the one surface 42 of the lever bracket 40, thereby forming a separation gap a, as illustrated in FIG. 9.

Therefore, the lever bracket 40 is rotated in a state of being spaced apart from the return spring guide 30 when the lever bracket 40 is rotated by the manipulation of a lever handle, and as a result, the lever bracket 40 does not cause friction with the return spring guide 30, thereby improving rotation characteristics of the lever handle.

When the lever bracket 40 is rotated by receiving rotational manipulation force from the lever handle, the clutch cam 10 is also rotated integrally with the lever bracket 40. In this case, since the rotations of the two coupling protrusions 18 and the two seating projections 19 of the clutch cam 10 are guided by the first guide surfaces 261 and the second guide surfaces 262, respectively, the rotations may be stably guided in comparison with a case in which rotations of three coupling protrusions are guided by three guide surfaces in the related art, and as a result, it is possible to improve operation reliability of the clutch cam 10 and the seat pumping device.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A seat pumping device for a vehicle, the seat pumping device comprising:
    a housing;
    a return spring guide which is fixedly coupled to the housing and has an embedded return spring;
    a clutch cam which is rotatably accommodated in the housing; and
    a lever bracket which is partially accommodated in the return spring guide and coupled to the clutch cam so as to be rotated integrally with the clutch cam,
    wherein the lever bracket is maintained spaced apart from the return spring guide by a separation support means,
    wherein the clutch cam includes a clutch cam body having a polygonal block shape, and the separation support means includes at least one seating projection which protrudes in an axial direction from one surface of the clutch cam body and on which the lever bracket is seated, and wherein at least one coupling protrusion, which protrudes in the axial direction and is integrally coupled to the lever bracket, is formed on one surface of the clutch cam body.

2. The seat pumping device of claim 1, wherein at least two seating projections are provided, and the at least two seating projections have the same height in an axial direction.

3. The seat pumping device of claim 1, wherein at least two seating projections are provided, and the at least two seating projections are disposed symmetrically to be spaced apart from each other at a predetermined interval in a circumferential direction.

4. The seat pumping device of claim 1, wherein the seating projection is formed in an arc block shape.

5. The seat pumping device of claim 1, wherein at least two coupling protrusions and at least two seating projections are provided, and the coupling protrusions and the seating projections are alternately disposed in a circumferential direction.

6. The seat pumping device of claim 1, wherein the coupling protrusions have a quadrangular block shape, and protrude to the same height in the axial direction.

7. The seat pumping device of claim 1, wherein a height to which the coupling protrusion protrudes in the axial direction is greater than a height to which the seating projection protrudes in the axial direction.

8. The seat pumping device of claim 1, wherein a through hole into which the coupling protrusion and the seating projection are penetratively inserted is formed in the housing, and a first guide surface and a second guide surface, which guide rotations of the coupling protrusion and the seating projection, respectively, are formed in the through hole.

9. The seat pumping device of claim 8, wherein the housing includes a drum, and the through hole is formed to penetrate a bottom surface of the drum.

10. The seat pumping device of claim 8, wherein the first guide surface and the second guide surface are alternately formed in a circumferential direction.

11. The seat pumping device of claim 8, wherein a radius of the first guide surface is greater than a radius of the second guide surface, and a rotation radius of the coupling protrusion is greater than a rotation radius of the seating projection.

\* \* \* \* \*